US008698412B2

(12) United States Patent  
Srimuang et al.

(10) Patent No.: US 8,698,412 B2
(45) Date of Patent: Apr. 15, 2014

(54) HIGH INTENSITY DISCHARGE BALLAST CONFIGURED TO ACCOMMODATE WIDE RANGE OF INPUT AND OUTPUT CHARACTERISTICS

(75) Inventors: Paul Srimuang, San Diego, CA (US); Shawn W. DeKalb, San Diego, CA (US)

(73) Assignee: Empower Electronics, Inc., San Diego, CA (US)

( * ) Notice: Subject to any disclaimer, the term of this patent is extended or adjusted under 35 U.S.C. 154(b) by 336 days.

(21) Appl. No.: 13/180,104

(22) Filed: Jul. 11, 2011

(65) Prior Publication Data

US 2013/0015779 A1    Jan. 17, 2013

(51) Int. Cl.
*H05B 41/16* (2006.01)

(52) U.S. Cl.
USPC .......................................... 315/247; 315/308

(58) Field of Classification Search
USPC ....................... 315/209 R, 226, 247, 291, 308
See application file for complete search history.

(56) References Cited

U.S. PATENT DOCUMENTS

| | | | |
|---|---|---|---|
| 3,889,152 A | 6/1975 | Bodine, Jr. et al. | |
| 3,989,976 A | 11/1976 | Tabor | |
| 4,890,041 A | 12/1989 | Nuckolls et al. | |
| 5,010,279 A | 4/1991 | Lathom et al. | |
| 5,694,007 A | 12/1997 | Chen | |
| 6,114,816 A | 9/2000 | Nuckolls et al. | |
| 7,009,347 B2 | 3/2006 | Henze | |
| 7,180,251 B2 | 2/2007 | van Eerden | |
| 7,529,107 B2 | 5/2009 | Mehta | |
| 7,804,256 B2 * | 9/2010 | Melanson | 315/291 |
| 7,911,153 B2 * | 3/2011 | Srimuang | 315/291 |
| 2007/0194721 A1 * | 8/2007 | Vorperian et al. | 315/247 |
| 2012/0043899 A1 * | 2/2012 | Veskovic | 315/200 R |
| 2012/0313538 A1 * | 12/2012 | Kumar et al. | 315/200 R |

\* cited by examiner

*Primary Examiner* — Thuy Vinh Tran
(74) *Attorney, Agent, or Firm* — Roeder & Broder LLP; James P. Broder

(57) ABSTRACT

A ballast includes a power supply subsystem, a power factor correction circuit, a control subsystem and a half bridge. In one embodiment, the power supply subsystem receives an input line voltage that is within a range of approximately 310-530 volts AC or other suitable ranges. Further, in one embodiment, the power supply subsystem provides a rectified DC output. The power factor correction circuit receives the rectified DC output. In one embodiment, the power factor correction circuit includes a boost converter and a buck converter that produce a selected stable bus voltage that is less than approximately 700 volts DC. The control subsystem outputs control signals based on a digital input. The half bridge receives the bus voltage and the output control signals. Additionally, the half bridge outputs a high frequency signal to a lamp. In one embodiment, the control subsystem includes a microcontroller and a ballast controller. Further, in one embodiment, the ballast controller includes a software module that receives the digital input and provides first input control signals to the microcontroller.

20 Claims, 3 Drawing Sheets

BALLAST BLOCK DIAGRAM

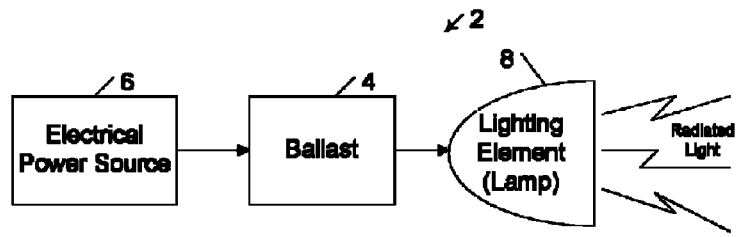
FIG. 1
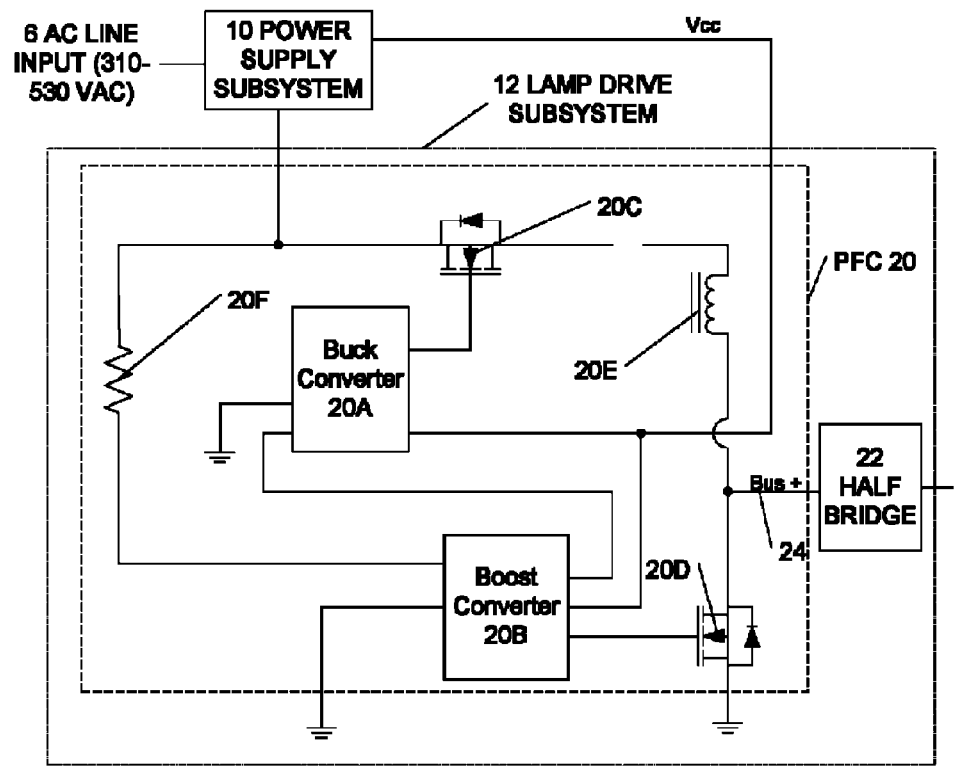
FIG. 3 Lamp Drive Subsystem

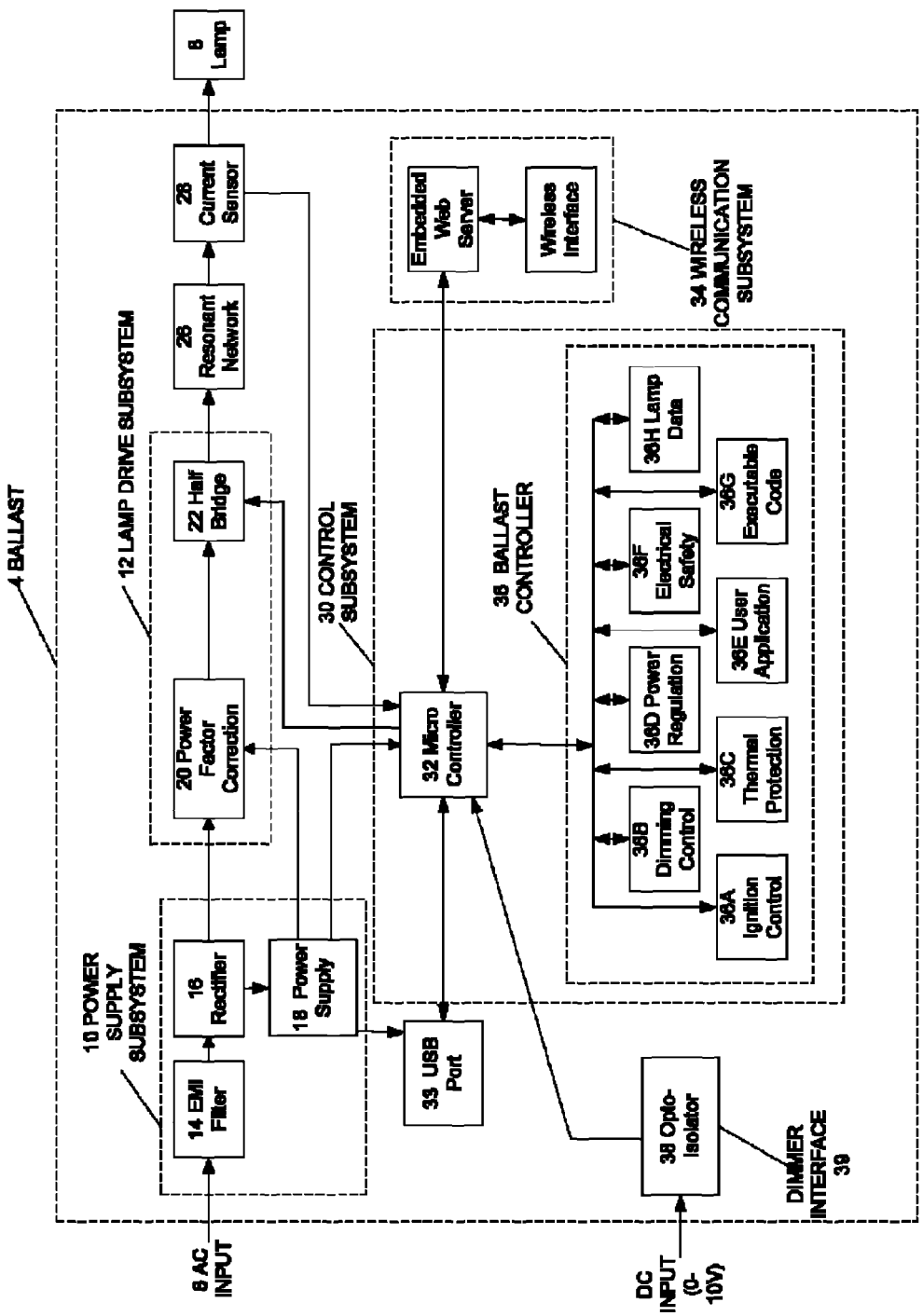
FIG. 2: BALLAST BLOCK DIAGRAM

HIGH INTENSITY DISCHARGE BALLAST CONFIGURED TO ACCOMMODATE WIDE RANGE OF INPUT AND OUTPUT CHARACTERISTICS

BACKGROUND

HID (high intensity discharge) arc lamps are in wide use for general illumination. Applications include roadside street lamps, sports arena illumination, stadium illumination, auto dealership illumination, warehouse illumination, and other purposes requiring a high power of illumination with high efficiency. They tend to be mounted at fairly high elevations requiring maintenance crews to replace.

A typical digital ballast previously used with these lamps is optimized for a fairly narrow range of input line voltages such as from about 100 to about 700 volts AC (alternating current). Line voltages are typically rectified and then boosted to a level of about 400-450 volts DC (direct current) to provide a power source for the last stage of the ballast. When accommodating higher input line voltages above about 300 volts AC the typical electronics become an issue because the rectified and boosted DC voltages become difficult to accommodate.

Other issues with the past ballast design is with variation in initial lamp characteristics and over the life of the ballast. For example, varying lamp impedances either due to initial variations or over lamp life reduce efficiency of some HID lamps. This exacerbates the problem of accommodating varying line input voltages.

SUMMARY

The present invention is directed toward a ballast including a power supply subsystem, a power factor correction circuit, a control subsystem and a half bridge. In one embodiment, the power supply subsystem receives an input line voltage that is within a range of approximately 310-530 volts AC. Further, the power supply subsystem can provide a rectified DC output. The power factor correction circuit receives the rectified DC output. The power factor correction circuit can include a boost converter and a buck converter that produce a selected stable bus voltage that is less than approximately 700 volts DC. The control subsystem outputs control signals based on a digital input. The half bridge receives the bus voltage and the output control signals. Additionally, the half bridge outputs a high frequency signal to a lamp.

In one embodiment, the input line voltage is within a range of approximately 300-400 volts AC. In another embodiment, the input line voltage is approximately 347 volts AC. In yet another embodiment, the input line voltage is within a range of approximately 400-500 volts AC. In still another embodiment, the input line voltage is approximately 480 volts AC. The bus voltage can be within the range of approximately 400-450 volts DC.

In accordance with one embodiment, the control subsystem can include a microcontroller and a ballast controller. Further, the ballast controller can include a software module that receives the digital input and provides first input control signals to the microcontroller.

In another embodiment, the ballast can also include dimmer circuitry that provides second input control signals to the microcontroller. In one such embodiment, the microcontroller can provide the output control signals to the half bridge at least partially based upon the first and second input control signals.

In another embodiment, the half bridge outputs a frequency that is greater than approximately 50 KHz. In another embodiment, the frequency of the high frequency signal output by the half bridge is modulated according to the output control signals from the control subsystem.

BRIEF DESCRIPTION OF THE DRAWINGS

FIG. 1 is a simplified block diagram of a system including a power source, a ballast, and a lamp having features of the present invention;

FIG. 2 is a block illustrating one embodiment of the ballast having features of the present invention;

FIG. 3 is a block diagram illustrating one embodiment of a lamp drive subsystem having features of the present invention.

DESCRIPTION

Figure 4:
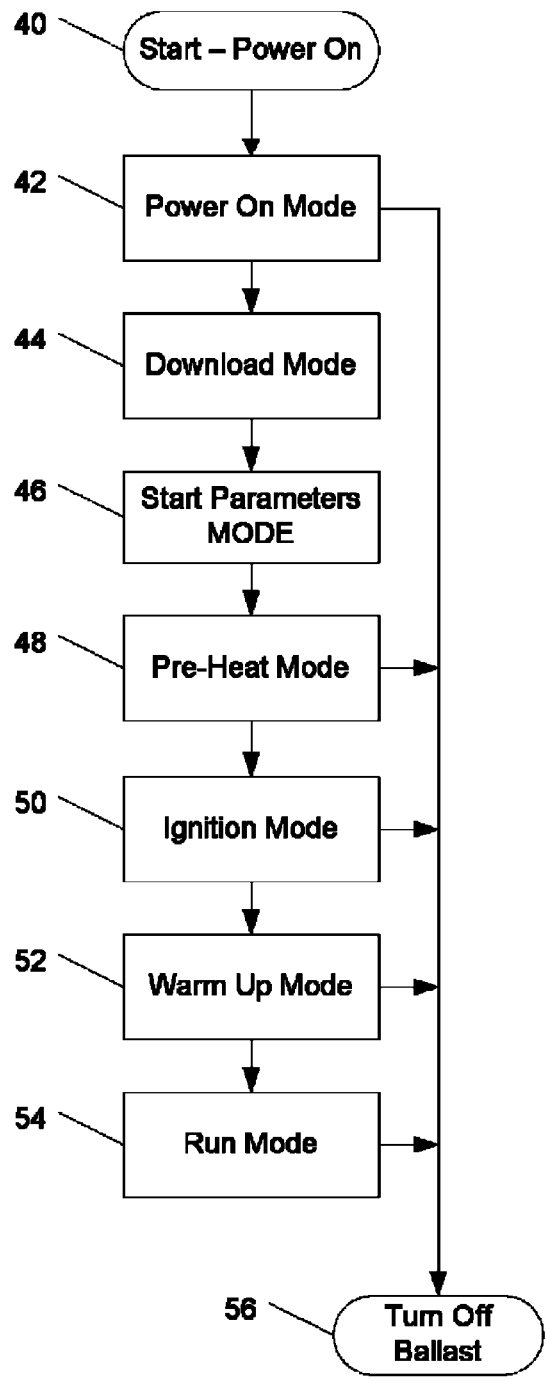
FIG. 4 is a flow chart illustrating one embodiment of a method having features of the present invention.

Relative to prior designs, the digital HID ballast of the present invention can accommodate a wider range of input voltages and a wider range of lamp characteristics than prior ballasts. In certain embodiments, the ballast architecture includes a lamp drive subsystem, a control subsystem, and a sensor that operate together to assure proper operation with varying input and output requirements. In some embodiments, the ballast can also include other components such as a power supply subsystem, a resonant network, a dimmer input, and an output sensor.

FIG. 1 illustrates a block diagram of a system 2 according to the present invention. A ballast 4 receives power from an electrical power source 6 and delivers high frequency power signals to a lighting element 8. In certain embodiments, the ballast 4 can receive a wide range of voltages. For example, in one embodiment, the electrical power source 6 is a power line that delivers power that is within a range including approximately 320-510 volts AC. In one embodiment, the ballast 4 can be microprocessor-controlled and can efficiently drive a variety of different lamps 8 before and after aging and having a range of different characteristics or impedances.

FIG. 2 illustrates one embodiment of a ballast 4 according to the present invention. Ballast 4 receives input power from line input 6 and delivers high frequency power to HID lamp 8. In one embodiment, line input 6 provides power in the range of approximately 310-530 volts AC. In another embodiment, line input 6 provides power in the range of approximately 347-480 volts AC. In yet another embodiment, line input 6 provides power in the range of approximately 450-500 volts AC. In still another embodiment, line input 6 provides power in the range of approximately 300-400 volts AC. In another embodiment, line input 6 provides power at approximately 480 volts AC. In but another embodiment, line input 6 provides power at approximately 347 volts AC. Alternatively, line input 6 can provide AC power at voltages outside of and/or within the above listed ranges.

The AC power waveform from line input 6 is received by power supply subsystem 10 that rectifies the power and provides DC power to lamp drive subsystem 12. Power supply subsystem can filter out extraneous signals from the incoming waveform via EMI filter 14 and can then rectify the waveform via rectifier 16. Power supply subsystem 10 can also include a power supply 18 for providing lower voltage power to other portions of ballast 4 as indicated in FIG. 2.

The rectified power from rectifier 16 is passed to PFC 20 (power factor correction circuit) of lamp drive subsystem 12. PFC 20 can adjust the power factor of the drive signal before delivering the bus voltage to half bridge 22. PFC 20 is configured to boost the voltage from rectifier 16 such that an output voltage from PFC 20 to half bridge 22 is optimized.

Turning now to FIG. 3, PFC 20 is illustrated in additional detail. In the embodiment illustrated in FIG. 3, PFC 20 is configured to receive a rectified DC voltage from power supply subsystem 10 and to deliver a bus voltage 24 to half bridge 22. In one embodiment, PFC 20 can include buck converter 20A, boost converter 20B, and FETS (field effect transistors) 20C and 20D, inductor 20E, and/or resistor 20F. In some embodiments, PFC 20 may have other components as well but some may be left out of FIG. 3 for illustrative simplicity.

As used herein, boost converter 20B can be otherwise known as a step up converter 20B. Boost converter 20B can boost the DC voltage level received from power supply subsystem 12. Further, as used herein, buck converter 20A can be otherwise known as a step down converter 20A. Buck converter 20A can regulate the voltage delivered to half bridge 22. Buck converter 20A and boost converter 20B can work together to enable ballast 4 to accept varying input AC voltages and/or to keep the bus voltage stabilized in a narrow range near a selected value.

In one embodiment the input voltage 6 can vary from approximately 310-530 volts AC but the bus voltage delivered to the half bridge 22 is stable to a specific stable value selected from a range of up to approximately 700 volts. In one embodiment, the bus voltage 24 can have a stable value that may be selected from a range such as approximately 400-600 volts DC. In another embodiment the bus voltage 24 can have a stable value that may be selected from a range of approximately 400-500 volts AC. In yet another embodiment the bus voltage 24 can have a stable value that is approximately 425 volts AC.

Turning back to FIG. 2, half bridge 22 can deliver high frequency power to lamp 8 via the resonant network 26. In one embodiment, the power delivered to lamp 8 has a frequency of at least 50 KHz. In another embodiment, the frequency is at least approximately 70 KHz or within a range of approximately 70 KHz to 300 KHz. In one embodiment, ballast 4 delivers less than approximately 750 watts of power to lamp 8 with a frequency of at least approximately 100 KHz. In another embodiment, ballast 4 delivers more than approximately 750 watts of power to lamp 8 with a frequency between approximately 70 KHz and 100 KHz.

In this embodiment, between resonant half bridge 22 and lamp 8 is sensor 28. Sensor 28 is configured to detect a power level delivered to lamp 8. In one embodiment sensor 28 can be a current sensor. In alternative embodiments, sensor 28 can include other suitable types of sensors.

Ballast 4 can also include a control subsystem 30 that is configured to provide output control signals to half bridge 22 to control the power level delivered to lamp 8. Control subsystem 30 can include micro controller 32 that can serve as a control interface between input/output ports 33 and 34, half bridge 22, ballast controller 36, and/or opto-isolator 38 (for dimmer interface).

In one embodiment, ballast controller 36 can provide first input control signals to microcontroller 32 based on digital inputs to ballast controller 36. In some embodiments, opto-isolator 38 can provide second input control signals to microcontroller 32 based on selected dimming level. In one embodiment, microcontroller 32 can provide output control signals to half bridge 22 based upon the first and second input control signals.

In one embodiment, the output control signals from microcontroller 32 modulate a power level of the high frequency power signals provided by half bridge 22 to resonant network 26 and lamp 8. In this embodiment, the output control signals modulate the power level by modulating the frequency of the high frequency power signals. In this embodiment, an increase in the frequency reduces the power of the high frequency power signals. A decrease in the frequency can increase the power of the high frequency power signals.

Ballast controller 36 stores computer code defining a plurality of different software modules 36A-H providing functions including that of control and reporting operation of ballast 4. Software modules 36A-H can be accessible by a client device (not shown) through I/O ports 33 and 34. In one embodiment, ballast controller 36 is configured to execute the computer code to report information to I/O ports 33 and 34, receive inputs from sensor 28, and/or to control lamp drive subsystem 12. In one embodiment, software modules ballast controller can include one or more of ignition control module 36A, dimming control module 36B, thermal protection module 36C, power regulation module 36D, user application module 36E, electrical safety module 36F, executable code module 36G, and lamp data module 36H. Also as modules are discussed herein, the term "module" refers to the software code itself or to ballast controller 36 executing the software along with associated data stored in memory registers.

Lamp data module 36H is configured to store data related to lamp 8. When lamp 8 is installed, ballast 4 may read data from the lamp (that may be stored on lamp 8) that pertains to lamp characteristics such as the proper operating voltage, a power rating, etc. Alternatively, a client device (not shown) may communicate this information to controller 36 using I/O 33 or 34. From this information, ballast controller lamp data module 36H can determine and/or store a maximum power rating for lamp 8 that is the power to be applied to lamp 8 for full or maximum power, for example.

Lamp dimming control module 36B is configured to receive a dimming level for lamp 8 from a dimmer interface 39. In one embodiment, dimmer interface 39 can act through opto-isolator 38 that receives a voltage from 0 to 10 volts depending upon the dimming set point for which 0 volts corresponds to no dimming and 10 volts corresponds to 50% dimming, for example. The dimming level can be a percentage reduction of the maximum power which lamp drive subsystem 10 is to deliver to lamp 8. From this dimming level, in this embodiment, module 36B is configured to compute a specified power level to be delivered to lamp 8. The specified power level may be the maximum power level or it may be a fraction of the maximum power level pursuant to the input dimming level.

In one embodiment, lamp power regulation module 36D is configured to control power delivered by lamp drive subsystem 12 to lamp 8. Further, power regulation module 36D can receive inputs such as those from current sensor 28 and a voltage sensor that monitor output current and voltage of lamp drive subsystem 12 during operation of ballast 4. From the current and/or voltage information inputs, the power regulation module 36D can compute a real time power level of power being delivered by lamp drive subsystem to lamp 8.

Power regulation module 36D is further configured to compare the computed real time power level actually delivered to the specified power level that is to be delivered to lamp 8. In response to the comparison, power regulation module 36D is configured to control half bridge 22 in order to modulate the frequency of power being delivered from half bridge 22 to lamp 8. Increasing the frequency delivered will lower the power level delivered. Decreasing the frequency increases the power level delivered. Therefore, power regulation module 36D is configured to control half bridge 22 to reduce the frequency of power delivered to lamp 8 in response to a comparison indicating that the real time power level is less than the specified power level. Power regulation module 36D is configured to control half bridge 22 to increase the frequency of power delivered to lamp 8 in response to a comparison indicating that the real time power level is greater than the specified power level.

FIG. 4 is a flow chart illustrating one embodiment of a start up and operation process for ballast 4. Prior to the process of FIG. 3, the lamp is turned off. According to step 40, the lamp operation sequence is started. According to step 42, a power on fault check process takes place. This can include verifying that input voltage 6 is within an acceptable range, verifying that the lamp temperature is below a certain limit, and/or verifying that installed lamp ratings are acceptable for the ballast 4. If the fault check fails, the ballast is turned off according to step 56.

If the fault check of step 42 passes, then the ballast 4 can operate in a download mode according to step 44. During step 44, the ballast controller receives information from a client (not shown) using a wired link 33 or a wireless link 34. During step 44, ballast controller 36 may receive new parameters, software updates, and/or new executable code.

According to step 46, the ballast controller 36 initializes processor parameters. At this point, various settings such as a specified power level for lamp 8 are loaded into registers. According to step 48, ballast 4 operates lamp 8 in a preheat mode before igniting the lamp according to step 50. Once ignited, the lamp is warmed up according to step 52. Once the lamp is warmed up, it is operated according to step 54 until it is turned off according to step 56.

The run mode according to step 54 includes a closed loop control that regulates power delivered to lamp 8 based upon the frequency applied by half bridge 22. This allows ballast 4 to better control or optimize the power output to lamp 8 that can compensate for the type and aging of lamp 8.

While a number of exemplary aspects and embodiments of a ballast 4 and other described structures have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A ballast comprising:
a power supply subsystem that receives an input line AC voltage and outputs a rectified DC voltage;
a power factor correction circuit that receives the rectified output and applies a conversion that produces a stable bus voltage;
a half bridge that receives the bus voltage and outputs a high frequency signal; and
a control subsystem including a ballast controller and a microcontroller, the ballast controller receiving a digital input from an external computer system, the ballast controller providing a plurality of input control signals to the microcontroller based upon the digital input, the microcontroller providing an output control signal to the half bridge based upon the plurality of input control signals, the output control signal controlling a power level of the high frequency signal that is output by the half bridge.

2. The ballast of claim 1 wherein the input line voltage is within a range of approximately 300-400 volts AC.

3. The ballast of claim 1 wherein the input line voltage is approximately 347 volts AC.

4. The ballast of claim 1 wherein the input line voltage is within a range of approximately 400-500 volts AC.

5. The ballast of claim 1 wherein the input line voltage is approximately 480 volts AC.

6. The ballast of claim 1 wherein the the ballast controller includes a software module.

7. The ballast of claim 1 wherein the frequency of the high frequency signal output by the half bridge is modulated according to the output control signal from the control subsystem.

8. The ballast of claim 1 wherein the high frequency signal has a frequency in the range of approximately 70-300 KHz.

9. The ballast of claim 1 wherein the input line AC voltage is within a range of approximately 310-530 volts AC.

10. The ballast of claim 1 wherein the bus voltage is less than approximately 700 volts DC.

11. The ballast of claim 1 wherein the high frequency signal is greater than approximately 50 KHz.

12. The ballast of claim 1 wherein the output control signal controls the power level of the high frequency signal by modulating the frequency of the high frequency signal.

13. The ballast of claim 1 wherein the control subsystem includes dimmer circuitry.

14. A ballast comprising:
a power supply subsystem that receives an input line voltage that is within a range of approximately 310-530 volts AC, the power supply subsystem providing a rectified DC output;
a power factor correction circuit that receives the rectified DC output, the power factor correction circuit including a boost converter and a buck converter that produce a selected stable bus voltage that is less than approximately 700 volts DC;
a control subsystem that outputs control signals based on a digital input, the control subsystem including a microcontroller and a ballast controller, the ballast controller including a software module that receives the digital input and provides first input control signals to the microcontroller;
a half bridge that receives the bus voltage and the output control signals, the half bridge outputting a high frequency signal to a lamp; and
dimmer circuitry that provides second input control signals to the microcontroller, the microcontroller providing the output control signals to the half bridge at least partially based upon the first and second input control signals.

15. The ballast of claim 14 wherein the high frequency signal is greater than 50 KHz.

16. A ballast comprising:
a power supply subsystem that receives an input line AC voltage and outputs a rectified DC voltage;
a power factor correction circuit that receives the rectified output and applies a step up conversion and a step down conversion that supplies a stable specified bus voltage even when the rectified DC voltage varies;
a half bridge that receives the bus voltage and outputs a high frequency signal suitable for an HID lamp; and
a control subsystem including a ballast controller and a microcontroller, the ballast controller receiving digital inputs from an external computer system that specifies drive conditions for the lamp, the ballast controller providing first input control signals to the microcontroller based upon the digital inputs, the ballast controller including a plurality of software modules that receive the digital inputs and contribute to a computation of the first input control signals, the microcontroller providing output control signals to the half bridge based upon the first input control signals, the output control signal controlling a power level of the high frequency signal that is output by the half bridge.

17. The ballast of claim 16 wherein the bus voltage is less than approximately 700 volts DC.

18. The ballast of claim 16 wherein the input line AC voltage is within a range of approximately 310-530 volts AC.

19. A ballast comprising:
a power supply subsystem that receives an input line AC voltage and outputs a rectified DC voltage;
a power factor correction circuit that receives the rectified output and applies a step up conversion and a step down conversion that supplies a stable specified bus voltage even when the rectified DC voltage varies;
a half bridge that receives the bus voltage and outputs a high frequency signal suitable for an HID lamp;
a control subsystem including a ballast controller and a microcontroller, the ballast controller receiving digital inputs from an external computer system that specifies drive conditions for the lamp, the ballast controller providing first input control signals to the microcontroller based upon the digital inputs, the microcontroller providing output control signals to the half bridge based upon the first input control signals, the output control signal controlling a power level of the high frequency signal that is output by the half bridge; and
dimmer circuitry that provides second input control signals to the microcontroller, the output control signal being based upon the digital inputs and the second input control signals.

20. The ballast of claim 19 wherein the input line AC voltage is within a range of approximately 310-530 volts AC.

* * * * *